Aug. 9, 1960 T. H. W. HAUSSNER ET AL 2,948,418
MATERIAL HANDLING APPARATUS
Filed Jan. 4, 1957 2 Sheets-Sheet 2
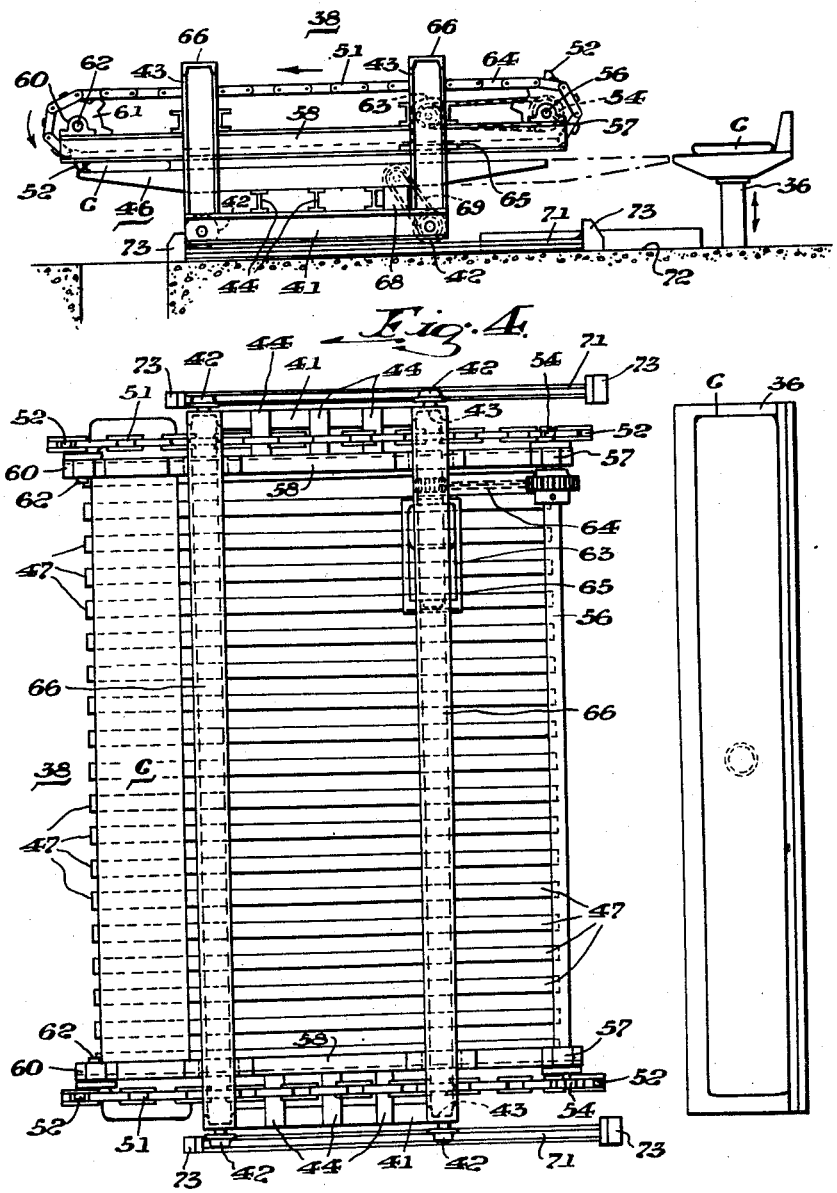
INVENTORS.
THEODOR H. W. HAUSSNER,
STEVEN W. MEYER.
BY Ralph B. Brick.
their ATTORNEY.

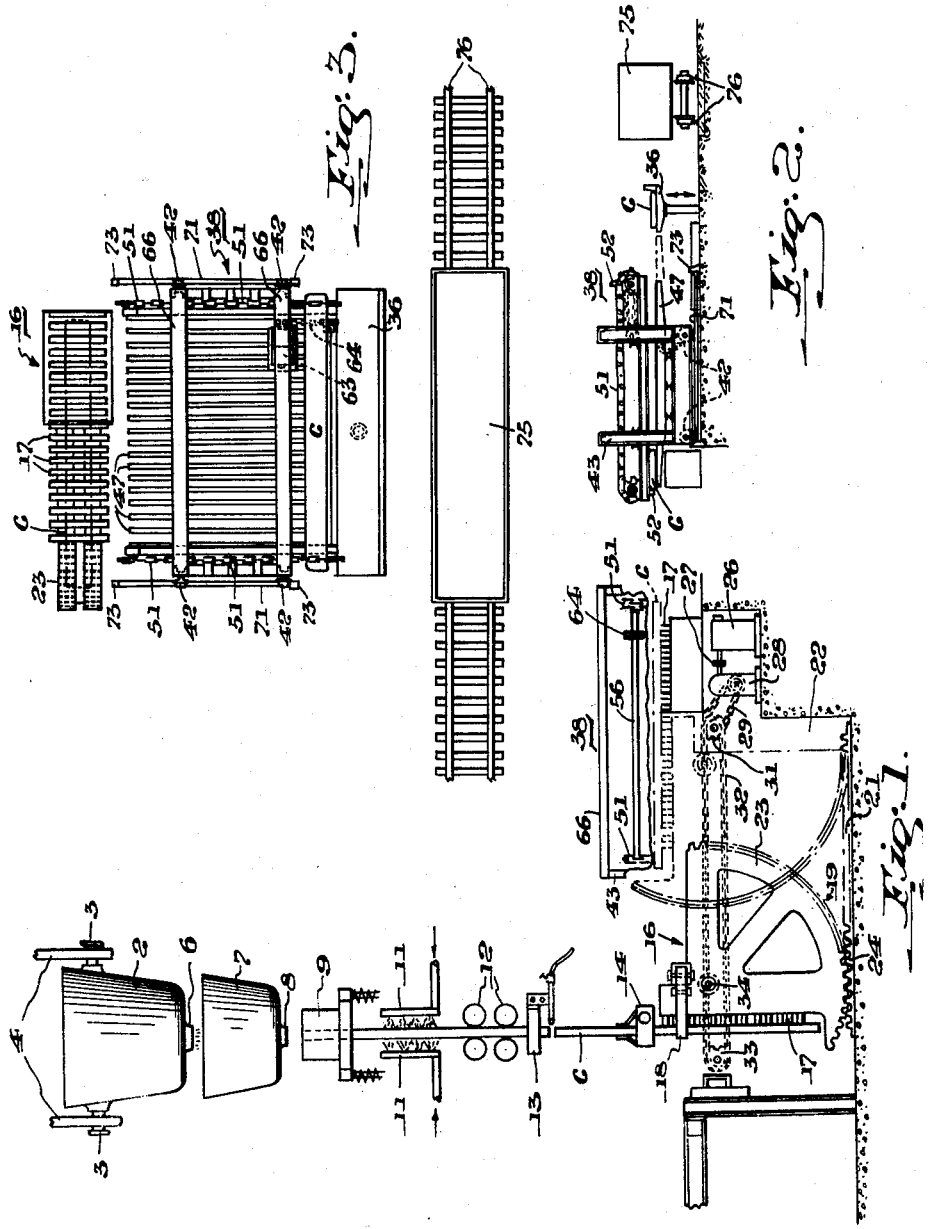

United States Patent Office 2,948,418
Patented Aug. 9, 1960

2,948,418

MATERIAL HANDLING APPARATUS

Theodor H. W. Haussner and Steven W. Meyer, Pittsburgh, Pa., assignors to Koppers Company, Inc., a corporation of Delaware Filed Jan. 4, 1957, Ser. No. 632,494

2 Claims. (Cl. 214—1)

This invention relates to material handling apparatus and more particularly to apparatus for handling bars cut off from vertical cast strands during vertical continuous casting operations.

To avoid the slowing down or stopping of vertical continuous casting operations, it is desirable that the apparatus which handles the cut-off bars, which bars can be in the form of slabs or billets, operate as efficiently as possible, requiring a minimum of motion and a minimum of space. Such handling apparatus of the past, however, has included heavy and complex pusher and chain conveyor mechanisms which have required large operating areas and, by their very nature of construction, have tended to interfere with the tilting apparatus with which they co-operate.

The present invention provides a bar handling apparatus which occupies a minimum of space so as to be suitable for existing mill facilities, which operates in a straightforward and efficient manner with a minimum of breakdown, and which avoids the interference problems that have arisen with apparatus in the past.

Various other features of the present invention will become obvious to one skilled in the art upon reading the disclosure set forth hereinafter.

More particularly, the present invention provides a material handling apparatus which can be used in continuous casting installations and which comprises a movable carriage having a wheel base and a horizontal skid table mounted thereabove, the skid table having end portions cantilevering over those ends of the wheel base lying in the direction of travel of the carriage, an endless conveyor means extending over the skid table between the cantilevering end portions thereof, and power means for the endless conveyor means to actuate the conveyor means to move material such as bars cut off from vertical cast strands from one cantilevering end portion of the skid table to the other cantilevering end portion of the table.

It is to be understood that various changes can be made by one skilled in the art in the arrangement, form, and construction of the several parts of the apparatus disclosed hereinafter without departing from the scope or spirit of this invention.

Referring to the drawings:

Figure 1 is an elevational view of the apparatus of the present invention, disclosing only a portion of the material handling apparatus which co-operates with the tilting apparatus for the bars cut off from vertical cast strands;

Figure 2 is a side elevational view of the material handling apparatus disclosed in Figure 1, a cut-off bar being ready for transfer to an hydraulic piler;

Figure 3 is a plan view of the apparatus of Figure 2, the apparatus having been moved to the hydraulic piler;

Figure 4 is an enlarged view of a portion of the apparatus disclosed in Figure 2;

Figure 5 is a plan view of the apparatus disclosed in Figure 4.

Referring to Figure 1 of the drawings, the continuous casting apparatus disclosed includes bottom pouring ladle 2 supported from trunnions 3 by bail 4. Ladle 2 is provided with nozzle 6 at the bottom thereof from which molten metal to be cast continuously passes into tundish 7. Tundish 7, in turn, is provided with pouring nozzle 8 at its bottom. Positioned immediately beneath nozzle 8 is an oscillatory, water-cooled, continuous casting mold 9. Spray cooling header 11 is positioned immediately below the mold to cool the cast strand issuing therefrom, and positioned below the spray cooling header is a set of pinch rolls 12. The set of pinch rolls serve to control the rate of descent of the cast strand from the mold above. A cut-off torch arrangement 13 is positioned below the pinch rolls to cut off bars from the vertical strand issuing from the pinch rolls. The apparatus described so far is conventional in the art and it is to be understood that various changes can be made in this apparatus without departing from the scope of the present invention.

To receive the bars as they are cut off from the cast strand, a bar receiving and handling apparatus in the form of a tilting mechanism is provided below each of the cut-off torch arrangements 13. This tilting mechanism can be any one of several types and, advantageously, in the present disclosure is like the one disclosed in the co-pending application No. 626,780 of Francis D. Dooley, assigned to Koppers Company, Inc., assignee of the present invention. The details of this tilting mechanism are set forth in this aforementioned Dooley application.

As set forth broadly in the present disclosure, this tilting mechanism includes a bar lowering clamp 14 and a bar receiving frame 16. Frame 16 has a set of skids 17 provided on the frame to support the bar and, a releasable clamping means 18 also is mounted on the frame to grip the bar firmly to hold it in place on the skids. It is to be noted that the set of skids 17 is comprised of spaced members so positioned that their longitudinal axes are transverse to the longitudinal axis of the bar supported thereby. The reason for such an arrangement of the skids will be more fully understood upon reading the disclosure hereinafter.

As can be seen in Figure 1, frame 16 is supported on rocking quadrant members 19, the quadrant members being adapted to ride on rails 21 positioned in shallow pit 22 of the casting shop. The quadrant members, as described in the Dooley application, are provided with toothed quadrant segments 23, the teeth of which segments engage with the teeth of racks 24 positioned on the floor of pit 22.

To rock the carriage frame 16 through its quadrant, power means in the form of a D.C. motor 26 is provided. D.C. motor 26 acts through coupling arrangement 27, speed reducer unit 28, and drive chain 29 to drive the sprocket assembly 31. Another endless drive chain 32 has one end passing around the sprocket assembly 31, the other end of this chain being supported by idle sprocket assembly 33. Chain 32 is connected intermediate assemblies 31 and 33 to shaft 34 which passes through the geometric centers of the rockable quadrant members 19. Thus, upon operation of drive motor 26, chain 32 is driven to rock carriage frame 16 through a 90° quadrant to move a bar supported thereon from a vertical to a horizontal position in a minimum of space and with a minimum of effort.

To remove the bar from frame 16 when it is in the horizontal position and to transfer it from such frame to a hydraulic piler 36, the present invention provides a bar handling apparatus in the form of a carriage broadly designated by reference numeral 38, which carriage operates in an efficient and straightforward manner in a minimum of space and a minimum of time. Referring particularly to Figures 2–5 of the drawings, this carriage 38 is comprised of a wheel base frame section 41 supported on wheels 42, the frame section having extending therefrom U-section upright members 43. Positioned above and transverse to the sides of frame 41 are spaced I beam members 44 and transversely supported on these I beam members between uprights 43 is a skid table broadly designated by reference numeral 46. As can be seen clearly in Figure 5 of the drawings, skid table 46 is comprised of a plurality of spaced skid members 47, members 47 cantilevering over the ends of the wheel base frame section 41 in the direction of travel of the carriage.

Referring to Figure 3 of the drawings, it can be seen that the direction of travel of the bar handling carriage 38 is normal to the longitudinal axis of a bar C as it rests on the set of skids 17 of the tilting mechanism. As will be seen hereinafter, when the frame 16 has been rotated through its quadrant to a horizontal position, continued movement of carriage 38 toward bar C on the set of skids 17 of frame 16 results in an intermeshing of spaced skid members 47 of carriage 38 with spaced skid members 17 of frame 16.

Positioned above skid table 46 are a pair of spaced endless drag chain conveyors 51. Although only two such conveyors are disclosed, it is to be understood that any number of conveyors can be employed depending upon the size of bar to be handled. These conveyors extend over the skid table between the cantilevering end portions of the table, each conveyor being provided with a pair of drag dogs 52 so spaced on the conveyor as to be substantially the maximum distance from each other. To drive each conveyor, a drive sprocket 54 is provided at one end of each conveyor to engage with the chain links thereof. Each of the drive sprockets 54 is mounted on the drive shaft 56, the ends of which shaft are journaled in the pair of spaced bearing boxes 57. As can be seen in Figure 4 of the drawings, each of the bearing boxes 57 is mounted, in turn, on one of a pair of spaced U-shaped channel members 58, each of the channel members 58 extending transversely to the spaced upright members 43 positioned on the same side of carriage 38 and being fixed thereto. The channel members 58, in addition to supporting bearing boxes 57, serve as guide members for the lower flights of endless conveyors 51. In this connection, it is to be noted that the other end of each of the endless conveyors 51 is provided with an idle sprocket 61. Each sprocket 61 is mounted on shaft 62 journaled in bearing box 60 supported on top of U-shaped channel 58. To rotate drive shaft 56 to set the endless conveyors 51 in motion, a power unit 63 is connected to the shaft by a conventional sprocket and chain drive arrangement 64. This power unit is supported between uprights 43 and below the transverse beams 66 on a platform 65 in a manner not shown in detail, the transverse beams 66 extending between the upper ends of the spaced upright members 43.

To drive carriage 38, a second power unit 68 is mounted on the wheel base frame section 41 below the top surface of skid table 46 and is connected to one of the shafts which supports the wheels 42 by means of a sprocket and chain drive mechanism 69. In this connection it is to be noted that the carriage 38 is mounted to travel on rails 71 positioned on floor 72 of the mill. Rails 71 extend between frame 16 and piler 36 to permit movement of carriage 38 in a direction normal to the longitudinal axes of the frame and piler. To limit movement of the rails, stops 73 are provided at the rail extremities, and positioned adjacent piler 36 in a position transverse to rails 71 is a second set of rails 76 (Figure 3). Rails 76 permit a freight or flat car 75 to move adjacent piler 36 so that a crane and chain hoist arrangement can move bars from piler 36 to the car to be carried to other parts of the mill.

In a typical operation of the above described apparatus and assuming a proper arrangement of limit switches is provided (not shown), after a bar has been moved by bar receiving frame 16 from a vertical position to a horizontal position and frame 16 has come to a stop, a first limit switch is actuated to start drive motor unit 68. Carriage 38 moves forward so that its skid members 47 pass under the bar supported by skid members 17 of frame 16, the skid members 47 and 17 intermeshing. A second limit switch terminates movement of carriage 38 and starts operation of motor unit 63. This causes endless conveyors 51 to move the bar from frame 16 unto skids 47 of carriage 38. A time delayed limit switch starts movement of carriage 38 in the opposite direction as soon as dogs 52 of conveyors 51 have started to move the bar on the skids 47 to the other end of the skid table, carriage 38 coming to a stop against stop member 73 in proximity of 1 to 2 inches of piler 36 with the endless conveyors 51 remaining in motion until the dogs 52 have pushed the bar unto the piler. A fourth limit switch then starts drive motor 68 in reverse and carriage 38 returns to its starting position.

Thus, in this manner an efficient and straightforward apparatus is provided which operates in a limited space and in a minimum of time to greatly reduce the possibilities of slowdown or breakdown of the continuous casting operations.

The invention claimed is:

1. A material handling apparatus for transferring material from one supporting means to another comprising a movable carriage having a wheel base and a horizontal skid table fixedly mounted thereabove, said skid table comprising a plurality of parallel, spaced skid members having cantilevering end portions extending over those ends of said wheel base lying in the direction of travel of said carriage, one of said cantilevering end portions of said parallel spaced skid members being adapted to mesh with complementary parallel spaced skid members of said supporting means, a plurality of spaced endless drag conveyors extending over said skid table parallel to said skid members and between said cantilevering end portions, said drag conveyors each having drag dogs mounted thereon, and power means for said endless drag conveyors to actuate said conveyors so that said drag dogs drag material from said one cantilevering end portion of said skid table adapted to be intermeshed with said supporting means to the other cantilevering end portion of said table.

2. The invention as defined in claim 1 in which each of said conveyor means consists of two drag dogs spaced along the lengths thereof so that one of said dogs is in an inoperative position during the period said other drag dog is operative to drag said material across said table.

References Cited in the file of this patent

UNITED STATES PATENTS

| | | |
|---|---|---|
| 581,036 | Pike | Apr. 20, 1897 |
| 866,519 | Rhodes | Sept. 17, 1907 |
| 2,734,643 | MacRae | Feb. 14, 1956 |

FOREIGN PATENTS

| | | |
|---|---|---|
| 609,532 | Germany | Feb. 16, 1935 |